United States Patent [19]

Weber

[11] Patent Number: 4,470,185
[45] Date of Patent: Sep. 11, 1984

[54] OIL SEAL AND SLEEVE INSTALLATION TOOL

[75] Inventor: Charles F. Weber, Delphos, Ohio

[73] Assignee: Federal-Mogul Corporation, Detroit, Mich.

[21] Appl. No.: 374,367

[22] Filed: May 3, 1982

[51] Int. Cl.³ .............................................. B23P 19/02
[52] U.S. Cl. ........................................ 29/235; 29/283.5; 277/152; 277/184
[58] Field of Search ............... 29/283.5, 235, 252, 29/450; 81/9.1 R, 9.1 M, 9.18; 277/152, 182, 183, 184, 1

[56] References Cited

U.S. PATENT DOCUMENTS

| | | | |
|---|---|---|---|
| 1,191,137 | 7/1916 | Powers | 277/184 X |
| 2,649,316 | 8/1953 | Beezley | 277/183 |
| 3,275,331 | 9/1966 | Mastrobattista et al. | 277/1 |
| 3,393,439 | 7/1968 | Shriver | 29/235 X |
| 3,443,845 | 5/1969 | Walchle et al. | 277/227 |
| 3,449,811 | 6/1969 | De Ligt | 29/450 X |
| 3,549,445 | 12/1970 | McMahon | 277/184 X |
| 3,995,868 | 12/1976 | Smith | 277/184 |
| 4,042,248 | 8/1977 | Williamitis | 277/152 X |
| 4,243,235 | 1/1981 | Repella | 277/152 |

Primary Examiner—Frederick R. Schmidt
Assistant Examiner—Steven P. Schad
Attorney, Agent, or Firm—Federal-Mogul Corporation

[57] ABSTRACT

A tool is disclosed for assembling a polytetrafluoroethylene shaft seal to a wear or service sleeve while simultaneously forming the polytetrafluoroethylene wafers into a desired configuration. The seal is formed and introduced onto the sleeve with a single reciprocation of the tool. The tool includes a series of specially arranged surfaces having different diameters for forming the wafers of the seal into a frustoconical shape, aligning the seal and sleeve, and inserting the sleeve into the seal.

5 Claims, 6 Drawing Figures

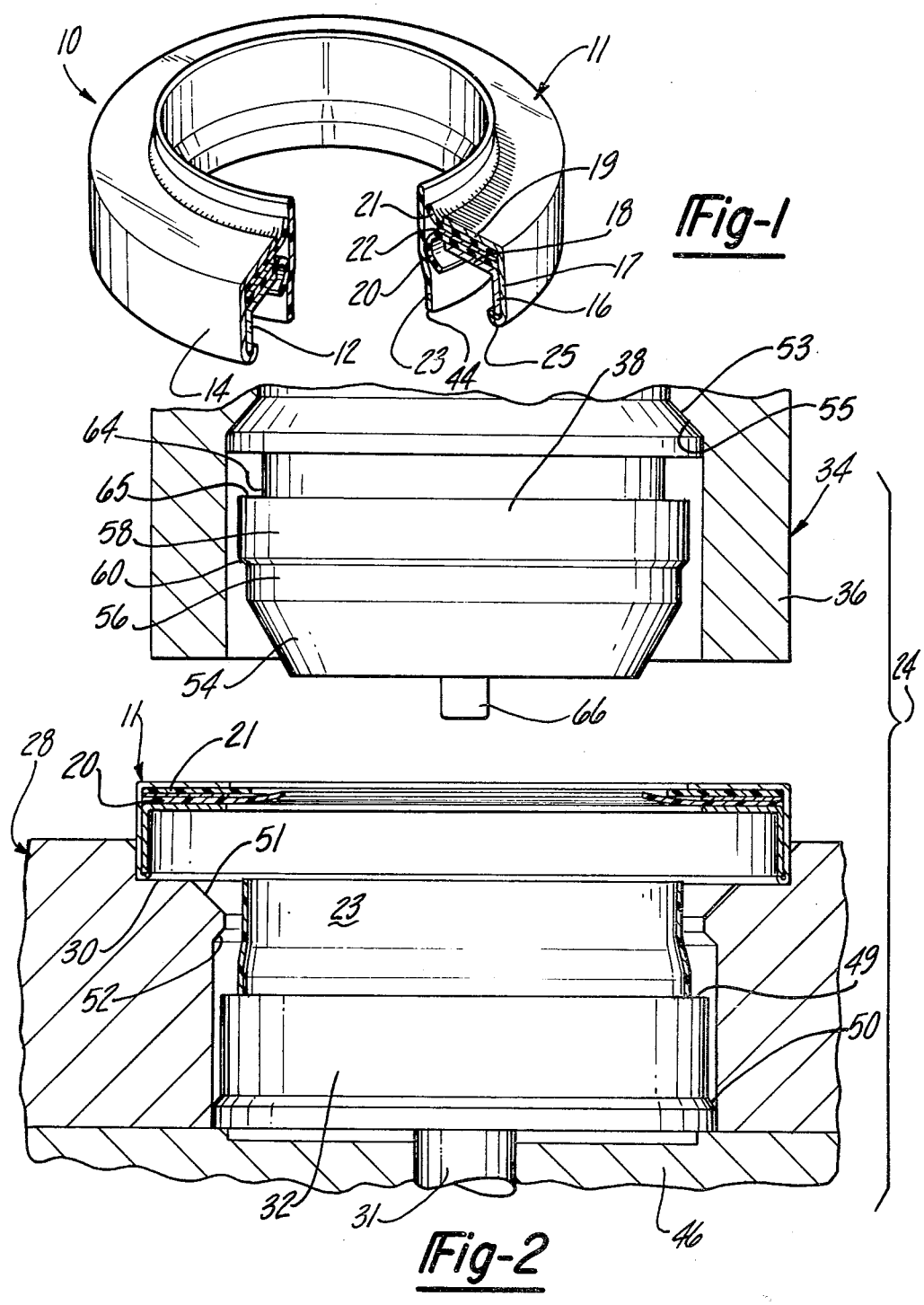

OIL SEAL AND SLEEVE INSTALLATION TOOL

TECHNICAL FIELD OF THE INVENTION

This invention relates generally to a tool for forming a seal and assembling the seal to a sleeve. More particularly, it relates to a method of forming a polytetrafluoroethylene (PTFE) seal and assembling it to either a wear sleeve or a service sleeve.

BACKGROUND OF THE INVENTION

In recent years PTFE has become popular as a material for seals due to its advantageous low-friction characteristics and durability. However, problems are encountered due to other physical properties of PTFE. Since PTFE is not moldable like natural or synthetic rubber, the PTFE sealing elements must be formed into the desired shape by alternate methods.

One type of PTFE seal is generally referred to as a "clamped case" seal because it includes an annular wafer of PTFE (the seal element) which is clamped between the parts of a two-part metal case. After a seal of this type is assembled, it is usually necessary to form the PTFE element into a generally frustoconical shape so that the free edge of the seal element is in a position to contact a shaft. It is also common practice to insert a sleeve member into the seal for purposes which will be described herein. This invention is directed to a device which forms the PTFE seal element into the desired shape and inserts a sleeve member into the seal.

By way of further background, the PTFE material is first formed into annular wafers that inherently are relatively rigid and have a high degree of elastic memory. In some designs a hydrodynamic surface pattern may be formed on the wafer. As will be more clearly described herein, the outer periphery of the wafer is clamped between the two parts of the metal case. The inner periphery of the wafer is free to perform the sealing function. This portion of the PTFE wafer is formed into a frustoconical shape so that the free edge of the wafer, and the hydrodynamic surface pattern, will be presented in operable orientation to the shaft. A sleeve is then inserted into the seal to maintain the frustoconical shape of the PTFE wafer until the seal is installed on a shaft. This sleeve may comprise a service sleeve which is eventually discarded or a wear sleeve which is mounted on the shaft with the seal.

More specifically, a service sleeve is a semi-rigid, cylindrical sleeve that is inserted into a PTFE seal prior to shipment to maintain the frusto-conical shape of the PTFE wafer and is used to facilitate slipping the seal over a shaft or inside a housing. The service sleeve reduces the possibility of injuring the PTFE sealing member during installation. Once the seal is in place, the service sleeve is removed, leaving the seal in position. A wear sleeve is a cylindrical metal sleeve used in repair applications and sheaths the shaft. The seal and wear sleeve are assembled to the shaft in one piece with the outer surface of the wear sleeve providing a smooth surface for engagement by the free edge, or lip portion, of the PTFE wafer.

Many seals are designed with a primary sealing lip and an auxiliary lip. The purpose of the auxiliary lip is to prevent the intrusion of foreign material between the surface of the shaft and the primary lip. Such foreign material is undesirable because it can cause undue wear of the primary sealing lip. The primary and auxiliary lips are usually oppositely directed when on the shaft with the primary lip being inwardly directed and the auxiliary lip being outwardly directed. This orientation of the primary and auxiliary lips is simple to achieve in prior art moldable materials, but is difficult to achieve with the rigid, nonmoldable PTFE seal elements.

Assembly of a PTFE seal to a wear sleeve is usually accomplished by forcing the sleeve axially through the PTFE wafer is one direction until the trailing lip snapped over the end of the sleeve. The sleeve was then moved in the opposite direction to bend the trailing lip in the opposite direction. This operation is tedious and can result in damage to the lip portions of the PTFE wafer if any burrs are present on the ends of the sleeve. Service sleeves on the other hand, are inserted into PFTE seals by folding the semi-rigid service sleeve and inserting it within the inner diameter of the PTFE sealing member. The service sleeve is then re-expanded to assume its normally cylindrical shape. This assembly technique is clumsy, imprecise and too frequently results in damage to either the service sleeve or the seal.

The present invention is directed to a tool for facilitating the forming of the PTFE element in seals and the assembly of such seals with a sleeve to overcome the problems set forth above.

SUMMARY OF THE INVENTION

The present invention comprises a combination forming and insertion tool for forming either single or double lip PTFE seals into the proper shape while simultaneously inserting a service sleeve or wear sleeve into the seal.

In one form, the tool of the present invention can be used in a standard press for mechanically forming the seal and inserting the sleeve. In this form the tool includes a lower die member having a nesting portion for holding the seal and a movable ejector for holding the sleeve in axial alignment with the seal and for inserting the sleeve into the seal. An upper die is also included having an annular shedder for holding the seal in the nesting portion of the lower die and a formplug axially shiftable relative to the shedder and being specially adapted to form the PTFE wafers into the desired frustoconical shape and to expand the wafers to a diameter suitable for accepting the sleeve member.

In a simplified form the formplug can be used alone for manually forming the PTFE wafers and inserting the sleeve member.

BRIEF DESCRIPTION OF THE DRAWINGS

FIG. 1 is a partially cut away, perspective view, of a double lip PTFE seal and a service sleeve in the formed and assembled condition;

FIG. 2 is a front elevational view in cross secton of the tool of the present invention;

DETAILED DESCRIPTION OF THE INVENTION

Figure 3:
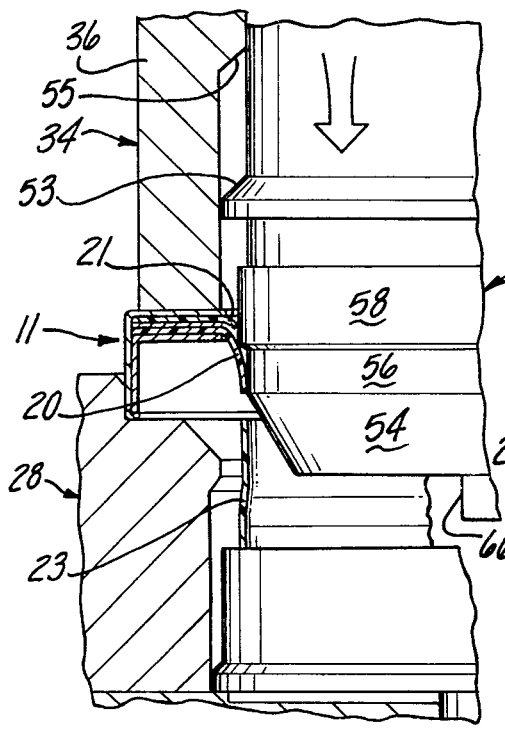
FIG. 3 is a view similar to FIG. 2 showing the positions of the tool components on the initial downward stroke.

Referring to FIG. 1, a PTFE seal assembled to a wear sleeve is generally shown at 10. The PTFE seal, generally indicated at 11, includes a two-piece metal case having an inner case 12 and an outer case 14. The inner case 12 is nestable within the outer case 14 and each includes axial cylindrical portions 16 and 17 and radial flange portions 18 and 19 extending radially inwardly from the cylindrical portions. Two PTFE wafers 20 and 21 and a gasket 22 are clamped between the flange portions 18 and 19 of the case members 12 and 14. The PTFE wafer 20 is formed into the primary lip and the PTFE wafer 21 is formed into the auxiliary, or dirt lip. In some designs the auxiliary lip is not needed so that this PTFE wafer can be eliminated. The gasket 22 prevents leakage and aids in clamping the primary and auxiliary wafers 20 and 21 within the case. The two case member 12 and 14 are held together in conventional fashion by swaging an edge 25 of the outer case 14 over the end of the inner case 12.

The seal 11 is shown assembled to a service sleeve 23. The service sleeve 23 is shown for illustrative purposes and can be replaced by a wear sleeve which also has a generally cylindrical configuration. As shown in FIG. 1, the free ends of the PTFE wafers 20 and 21 engage the outer surface of the service sleeve 23. These free ends comprise the lips of the seal, that is, those portions of the seal which make contact with the shaft. If a hydrodynamic pattern is formed on the wafers, it is located on the side which contacts the shaft.

Referring to FIG. 2, the tool of the present invention is generally shown at 24. The tool 24 is used for forming the PTFE wafers 20 and 21 of the seal 11 and inserting a sleeve into the seal to give an assembly as shown in FIG. 1. The tool 24 includes a lower die, generally indicated at 28, having an annular recess which defines a nest portion 30. The nest portion 30 is adapted to receive the seal case 11, as shown in FIG. 2. An ejector 32 is located in a central bore of the lower die 28 and is adapted to receive the sleeve 23. The ejector 32 is movable relative to the nest portion 30 of the lower die 28 so that the sleeve 23 can be moved toward the seal 11.

The tool 24 also includes an upper die, generally indicated at 34, which is disposed in axial alignment above the lower die 28 and is relatively shiftable thereto. The upper die 34 has an annular shedder 36 for engaging and clamping the seal 11 in the nest portion 30 of the lower die 28. The upper die 34 also includes a formplug 38 which is movable independently of the shedder 36. The formplug 38 is shaped to form the primary and auxiliary wafers 20 and 21 that are clamped in the seal 11. In addition to forming the PTFE wafers 20 and 21, the formplug 38 is adapted to receive the sleeve 23 and move it into position with respect to the PTFE wafers 20 and 21 to place them in the desired position on the sleeve 23.

The sleeve 23 may be either a wear sleeve or a service sleeve. As previously described herein; a wear sleeve is simply an annular metal sleeve designed to be press fit on a shaft to provide a smooth surface for the seal to engage. A service sleeve is used to protect the PTFE wafers 20 and 21 during shipment, handling, and installation. For purposes of describing the invention, a service sleeve 23 is shown in the drawings. The service sleeve is generally annular in shape and may be formed of inexpensive plastic material. One end 44 of the service sleeve 23 may be radially enlarged to facilitate sliding the service sleeve over the end of a shaft (not shown).

The tool 24 is used in the following manner. The lower die 28 is attached to the die bed 46 of a standard press (not shown). The ejector 32 is mounted within the lower die 28 and connected to a ram 31 for reciprocating the ejector 32 relative to the lower die 28. The ejector 32 has a generally planar top surface 49 which is perpendicular to the axis of the ejector 32 and has a slightly greater diameter than the sleeve 23 to support the sleeve 23 thereon. A frustoconical stop surace 50 extends about the periphery of the ejector 32 to limit the upward movement of the ejector upon contact with a complimentary frustoconical surface 52 on the lower die 28. The ram 31 of the ejector 32 is operably connected to a pneumatic pressure source, or the like, for lifting the ejector 32.

Referring to the upper die 34, the shedder 36 is attached to the upper ram of the press so that it can be moved toward and away from the lower die 28. During a cycle of the press, the shedder 36 is lowered until it engages the seal 11 thereby firmly holding the seal 11 in the nest portion 30 of the lower die 28. The formplug 38 is disposed within the inner diameter of the shedder 36 and is connected to an independently operable ram (not shown) so that the formplug 38 can move relative to the shedder 36. A frustoconical stop surface 53 extends about the periphery of the formplug 38 to limit the upward movement of the ejector relative to the shedder 36 upon contacting the complimentary frustoconical surface 55 on the shedder 36.

The formplug 38 includes a tapered nose portion 54 which, upon cycling of the press, initially engages the free edges of the PTFE wafers 20 and 21 of the seal 11. A cylindrical, sleeve pilot surface 56 is located immediately behind the nose portion 54, the diameter of which is slightly smaller than the inner diameter of the unsupported end of the sleeve 23. A cylindrical forming surface 58 is located behind the sleeve pilot surface 56 and has a diameter that is slightly larger than the outer diameter of the sleeve 23 so that it can spread the primary and auxiliary wafers 20 and 21 to an extent sufficient to enable the insertion of the sleeve 23. A shoulder 60 forming the transition between the sleeve pilot surface 56 and the forming surface 58 may be radiused to assure that the wafers 20 and 21 can slide onto the forming surface without being damaged.

In the illustrated embodiment of the tool 24, a clearance groove 64 is formed about the diameter of the formplug 38, immediately above the forming surface 58. The diameter of the clearance groove 64 is smaller than the inner diameter of the auxiliary wafer 21. A shoulder 65 is formed between the forming surface 58 and the clearance groove 64 and this shoulder 65 may be radiused to prevent damage to the auxiliary wafer 21.

A pressure pin 66 may be located centrally within the formplug 38 for temporary engagement with the ejector 32. The pressure pin 66 is axially movable relative to the formplug 38 and has a lower surface adapted to engage the top surface 49 of the ejector 32 and an upper end (not shown) adapted to engage the upper punch pad (not shown) in lost motion relationship for mechanically syncronizing unclamping of the case 11 by the shedder 36.

The tool 24 is operated by first introducing an oil seal 11 and sleeve 23 into the lower die 28 by placing a sleeve 23 on the ejector 32 and placing an oil seal 11 in the nest portion 30 of the lower die 28 with the auxiliary wafer side up, as shown in FIG. 2. Thus, the seal 11 is initially held above the sleeve 23. The lead in surface 51 between the nest portion 30 and the opening in the lower die 28 may include a soft plastic insert if the tool is to be used with a wear sleeve to prevent scratching of the wear-sleeve.

As shown in FIG. 3, the machine cycle is initiated by moving the upper die 34 downwardly toward the lower die 28 until the shedder 36 contacts the seal 11 thereby clamping the seal 11 in place. Upon contacting the seal 11 the shedder 36 ceases downward movement while the formplug 38 continues downwardly through the seal 11 to engage and bend downwardly the primary and auxiliary wafers 20 and 21. As movement continues, the nose portion 54 of the formplug 38 enters the upper end of the sleeve 23. If the sleeve 23 is misaligned with the seal 11, the nose portion 54 of the formplug 38 acts to center the sleeve 23 with the central axis of the formplug 38. As the formplug 38 continues its downward motion, the forming surface 58 forces the auxiliary and primary wafers 20 and 21 radially outwardly and the sleeve pilot surface 56 enters the end of the sleeve 23.

Figure 4:
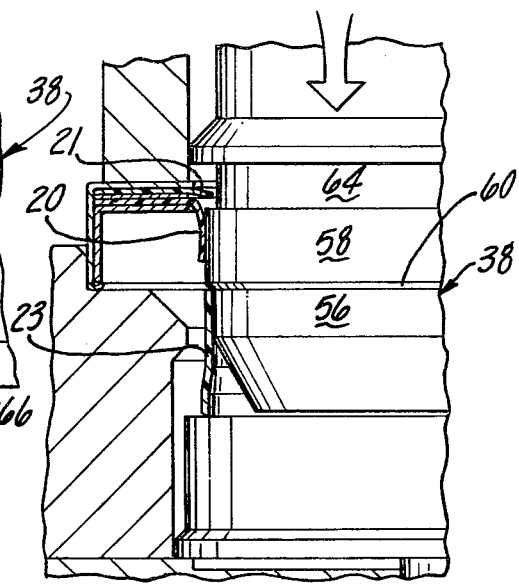
FIG. 4 is a view similar to FIG. 3 showing the positions of the tool components at the bottom of the stroke.

As shown in FIG. 4, the formplug 38 continues moving downwardly until the sleeve 23 is seated against the shoulder 60. At this point, if the seal 11 has both a primary wafer 20 and an oppositely directly auxiliary wafer 21, the auxiliary wafer 21 snaps past the forming surface 58 and into the clearance groove 64. The press at this point is at bottom dead center of its stroke.

Figure 5:
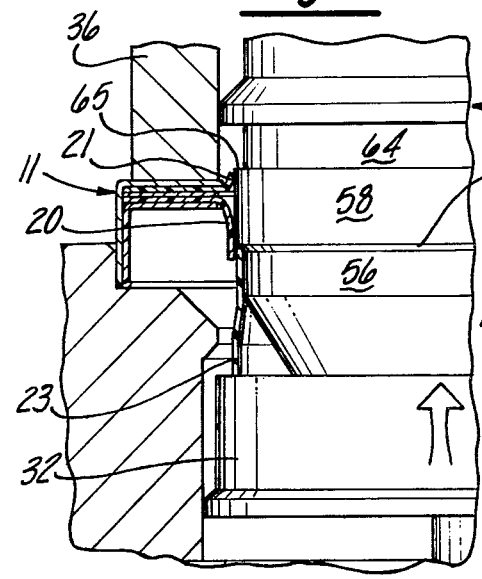
FIG. 5 is a view similar to FIG. 4 showing the positions of the tool components at the beginning of insertion of the sleeve into the seal.
Figure 6:
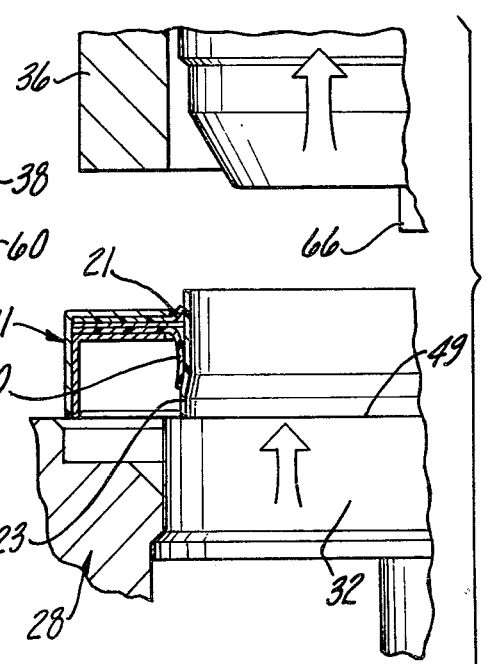
FIG. 6 is a view similar to FIG. 5 showing the positions of the tool components at the end of the assembly cycle.

After the tool 24 has reached the position shown in FIG. 4, the press begins its upward stroke and ejector 32 is pressurized to push the sleeve 23 upwardly as shown in FIG. 5. As the press begins its upward stroke, the auxiliary wafer 21 is caught by the groove shoulder 65 on the top of the forming surface 58 and is forced to bend in an upward direction. As the sleeve 23 is moved upwardly by the ejector 32 it follows the formplug 38 through the seal 11 until both wafers 20 and 21 of the seal 11 are located against the sleeve 23, as shown in FIG. 6. At this point, the upward motion of the ejector 32 is halted by the pressure pin 66 acting on a punch pad (not shown) in the upper die shoe (not shown). The pressure pin 66 thereby prevents the sleeve 23 from being inserted beyond the desired position within the seal 11. The formplug 38 continues its upward motion while the shedder 36 holds the seal 11 in the nest portion 30 of the lower die 28 thereby stripping the seal/sleeve assembly 11/23 from the formplug 38.

As the formplug 38 continues upwardly, the shedder 36 unclamps the seal 11 when the frustroconical stop surface 53 on the formplug 38 contacts the frustroconical stop surface 55 on the shedder 36. The shedder 36 and pressure pin 66 are simultaneously lifted upon contact of the two stop surfaces 53 and 55 by means of the shedder pins (not shown) acting on the punch pad (not shown). The upward motion of the ejector 32 then continues and lifts the seal/sleeve assembly 11/23 out of the nest portion of the lower die 28. The motion of the ejector 32 is halted when the frustoconical stop surface 50 contacts the frustoconical surface 52 of the lower die 28. At this point the seal/sleeve assembly 11/23 is positioned on the top surface 49 of the ejector 32 slightly above the top surface of the lower die 28 and is ready for removal from the tool 24. Removal may be effected either manually or automatically. After the seal-sleeve assembly 11/23 has been removed, the ejector 32 is depressurized and droped to its original position and is ready for the next cycle.

It is to be understood that the device of the present invention is equally useful in assembling a single wafer seal to a sleeve. If a single wafer seal is assembled to a sleeve 23 according to the present invention, the clearance groove 64 above the forming surface 58 need not be provided. Likewise, if a two wafer seal is required wherein both wafers extend in the same direction, the clearance groove is not necessary. The tool 24 can still be used to insert the sleeve 23 through both wafers 20 and 21 of the seal 11. The only difference in the operation of the tool in both instances being that it would not be necessary to form the auxiliary wafer 21 on the upward stroke of the press.

Thus it can be seen that the tool 24 of the present invention provides a quick and efficient way to form the PTFE wafers of a seal and to insert a wear sleeve or service sleeve. The procedure is accomplished in a single reciprocal press stroke and minimizes the chance of damage to the PTFE wafers 20 and 21 by applying a substantially uniform circumferential pressure upon the wafers to form them into the proper shape and direction while simultaneously sliding the sleeve 23 into position. Damage to the wafers is avoided since there is no need for the wafers to contact the edge of the sleeve at any time during the assembly process.

The invention has heretofore been described as an automated system. It should be noted that the formplug 38 can be used alone to manually form the seal 11 and insert the sleeve 23. In the manual mode, the formplug 38 is normaly positioned with the nose portion 54 up for easy access. The seal 11 is then moved over the nose portion 54 and onto the forming surface 58. If desired, the auxiliary wafer 21 can be reversely formed by snapping past the forming surface 58 into the clearance groove 64. The sleeve 23 is then placed on the sleeve pilot surface 56 and held there as the seal 11 is moved back toward the nose portion 54 and onto the sleeve 23. The seal/sleeve assembly 11/23 is then removed from the formplug 38 as a unit.

It is to be understood that the invention has been described with reference to a specific embodiment with various modifications being possible. The foregoing description is not to be construed in a limiting sense.

What is claimed is:

1. A tool for forming one or more annular wafers of a seal and assembling said seal to a cylindrical sleeve comprising: a generally cylindrical formplug including a tapered nose portion for initially engaging and forming the annular wafers of the seal in one direction and for centering the sleeve relative to the seal, a cylindrical sleeve pilot surface adjacent to said nose portion for receiving one end of the cylindrical sleeve, and a cylindrical forming surface adjacent to said sleeve pilot surface and having a diameter larger than the diameter of said sleeve pilot surface for expanding said one or more wafers of the seal radially outwardly to a diameter larger than that of the cylindrical sleeve to allow said cylindrical sleeve to be inserted within said one or more wafers, forming means following said cylindrical forming surface of said formplug for forming one or more of said wafers in a direction opposite to the direction of at least one other of said wafers, said forming means having a smaller diameter than said cylindrical forming surface and a shoulder formed by the intersection of said forming means and said forming surface, whereby said one or more wafers may be formed in a direction opposite to other of said wafers.

2. The tool as set forth in claim 1 wherein said formplug includes a radiused shoulder between said sleeve pilot surface and said forming surface.

3. A tool assembly for forming one or more wafers of a seal and assembling said seal to a cylindrical sleeve comprising: a lower die having a central passageway and an annular nest portion adapted to receive a preassembled seal; an ejector located in the central passageway of said lower die and being axially shiftable toward and away from said annular nest portion, said ejector including a support surface for supporting one end of the cylindrical sleeve and moving said sleeve toward the seal; and an upper die disposed above said lower die and being axially shiftable relative thereto, said upper die including a generally cylindrical formplug and an annular shedder surrounding said formplug and being moveable relative to said formplug, said formplug including a tapered nose portion for initially engaging and bending said one or more wafers of the seal, a sleeve pilot surface following said nose portion for receiving the unsupported end of the cylindrical sleeve, and a cylindrical forming surface following said sleeve pilot surface and having a diameter larger than the diameter of said sleeve pilot surface to expand the said one or more wafers of the seal radially outwardly to a diameter at least slightly greater than that of the cylindrical sleeve to allow said cylindrical sleeve to be inserted within said one or more wafers, a clearance groove following said cylindrical forming surface of said formplug, said clearance groove having a smaller diameter than said cylindrical forming surface and a shoulder formed by the intersection of said clearance groove and said forming surface, said shoulder being adapted to bend one or more of said wafers in a direction opposite to the direction of at least one other of said wafers whereby said one or more wafers may be formed in a direction opposite to other of said wafers.

4. The assembly as set forth in claim 2 wherein said formplug includes a radiused shoulder between said sleeve pilot surface and said forming surface.

5. The assembly as set forth in claim 3 wherein the ejector includes a planar top surface for supporting one end of said cylindrical sleeve.

* * * * *

UNITED STATES PATENT AND TRADEMARK OFFICE
CERTIFICATE OF CORRECTION

PATENT NO. : 4,470,185
DATED : September 11, 1984
INVENTOR(S) : Charles F. Weber It is certified that error appears in the above-identified patent and that said Letters Patent is hereby corrected as shown below:

Col. 2, line 15, "PFTE" should be —PTFE—

Col. 2, line 55, "secton" should be —section—

Col. 3, line 20, "member" should be —members—

Col. 4, line 12, "surace" should be —surface—

Col. 5, line 27, "directly" should be —directed—

Col. 6, line 1, "droped" should be —dropped—

Col. 6, line 32, "normaly" should be —normally—

Col. 8, line 17 (Claim 4) "2" should be —3

Signed and Sealed this

Fourteenth Day of January 1986

[SEAL]

Attest:

DONALD J. QUIGG

Attesting Officer

Commissioner of Patents and Trademarks